United States Patent [19]

Boothroyd

[11] 3,902,129

[45] Aug. 26, 1975

[54] DEMODULATING CIRCUITRY FOR PULSE RATE MODULATION DATA REPRODUCTION

[75] Inventor: William Arnold Boothroyd, San Jose, Calif.

[73] Assignee: International Business Machines Corporation, Armonk, N.Y.

[22] Filed: Apr. 19, 1974

[21] Appl. No.: 462,562

Related U.S. Application Data

[63] Continuation of Ser. No. 287,132, Sept. 7, 1972.

[52] U.S. Cl. ............... 329/107; 178/88; 235/61.11; 307/232; 328/109; 328/133; 325/321

[51] Int. Cl.$^2$ ........................................... H03K 9/06

[58] Field of Search .................. 329/107; 332/11 D; 328/109, 110, 133, 119, 134; 307/232; 325/320–322, 38 R, 38 B; 178/88; 235/61.11

[56] References Cited

UNITED STATES PATENTS

| | | | |
|---|---|---|---|
| 3,191,058 | 6/1965 | Stone | 307/232 |
| 3,657,732 | 4/1972 | Krause | 328/133 X |

OTHER PUBLICATIONS

Nassimbene-Digital Compare Circuitry, pp. 3421–3422, Vol. 14, No. 11, Apr. 1972, IBM Technical Disclosure Bulletin.

*Primary Examiner*—Alfred L. Brody
*Attorney, Agent, or Firm*—George E. Roush

[57] ABSTRACT

Variations in recording and/or scanning velocity in the reproduction of data from a recording of pulse rate modulation (PRM) are accommodated by original logical circuitry resolving the data at each pulse or transition as recorded. The reproducing circuitry is activated at each pulse or transition for measuring the periods between pulses or transitions and comparing successive measurements retrospectively. Upon recognizing a fundamental spacing or ratio of spacing of the PRM, for example, 1:1, an electric line is brought to a predetermined level indicative of a clocking pulse or transition. Any other ratio, for example, 2:1 in a common form, is recognized as data of a given nature. At clocking pulse time, another predetermined level is also indicative of data of nature opposite that of the given nature. At this clocking pulse time, component measuring circuitry is alternated and the reference component measuring circuitry is reset for succeeding retrospective comparisons of periods between pulses or transitions. Both analog and digital measuring and comparing circuitry is contemplated with conventional logical circuitry components and also by resolution in connection with a programmed digital computer.

20 Claims, 8 Drawing Figures

DEMODULATING CIRCUITRY FOR PULSE RATE MODULATION DATA REPRODUCTION

This is a continuation of application Ser. No. 287,132 filed on Sept. 7, 1972.

The invention relates to pulse rate modulation (PRM) systems for conveying information; and it particularly pertains to the decoding at a varying scanning rate of data recorded in PRM coding at fixed or varying rate, but it is not limited thereto.

Pulse rate modulation and systems using PRM are well known. U.S. Pat. Nos. 2,853,357 to Alfred W. Barber and 3,217,329 to Andrew Gabor show and describe magnetic recording systems, for example, using pulse rate modulation having a ratio of 2:1 for differentiating data on a binary basis. While other ratios can be used, the 2:1 ratio is by far the most common. Fewer and simpler electronic sub-circuits are required for implementing the 2:1 ratio pulse rate modulation apparatus because of the inherent binary characteristics obtainable.

Fundamentally, a PRM wave comprises two component waves harmonically related one to the other. Usually, the component wave of longer period (or lower frequency) is the base "timing" wave; and the component wave of shorter period (higher frequency) is the modulating wave, though this assignment is fixed only in the definition of a specific code.

Sine and square waves and pulse wave trains alike have been used in PRM systems. Tertiary, as well as binary systems, have been used, but the latter are by far the most common. Such a binary PRM is commonly known as F2F because the modulating wave is twice the frequency of the "timing" wave.

An example of F2F coding comprises a train of pulses spaced apart at substantially uniform intervals which can be sensed for recovering timing data and other pulses interposed midway between these timing pulses for representing data of one nature, for example, a binary unit (1). The absence of such a unit pulse between the timing pulses is then interpreted as binary naught (φ). In magnetic recording, each pulse is represented by a reversal or transition of magnetic flux in the record medium.

The prior art systems, for the most part at least, are concerned with substantially constant spacing or constant frequency PRM. In these systems, arrangements are made for gating PRM waves in order to exclude noise and other deleterious effects as much as possible. In many such arrangements, a modulating wave component is gated in accordance with the repetition of the timing wave component. Those arrangements have also been used in the demodulation process to accommodate reasonable variations in the timing by opening the tolerances. Examples of these arrangements are to be found in the following U.S. Pat. Nos.:

| | | | |
|---|---|---|---|
| 3,404,391 | 10/1968 | Chur | 340–174.1 |
| 3,405,391 | 10/1968 | Halfhill et al | 340–167 |
| 3,467,955 | 9/1969 | Poumakis | 340–174.1 |
| 3,510,780 | 5/1970 | Buehrle | 325–321 |
| 3,518,648 | 6/1970 | Norris | 340–174.1 |
| 3,597,752 | 8/1971 | Eldert et al | 340–174.1 |
| 3,623,074 | 11/1971 | Bailey | 340–347 |
| 3,701,886 | 10/1973 | Jones | 235–61.11 |

and in the technical literature as follows:

IBM Technical Disclosure Bulletin (TDB), Vol. 8, No. 2, July 1965, pp. 221–2, "Data Separator for Double Frequency with Reduced Timing Tolerance Requirements", L. G. Holmes and C. A. Walton;

IBM Technical Disclosure Bulletin (TDB), Vol. 12, No. 4, September 1969, pp. 529–32, "Adaptive Detector", J. M. Mortelmans;

IBM Technical Disclosure Bulletin (TDB), Vol. 13, No. 10, March 1971, p. 3055, "Demodulator", G. L. Dix;

IBM Technical Disclosure Bulletin (TDB), Vol. 9, No. 4, September 1966, pp. 378–9, "Information Detecting Apparatus", A. M. Gindi;

IBM Technical Disclosure Bulletin (TDB), Vol. 13, No. 8, January 1971, p. 2449, "Double Frequency Data/Clock Separator", A. F. Schwilk.

The prior art arrangements for accommodating variations are based on setting up circuitry on the occurrence of one event and predicting the range of time for the occurrence of the succeeding event and looking prospectively to that event. Simple logical circuit systems are given in the publications to Holmes and Walton, Mortelmans, Gindi; and Schwilk all of which are rather limited in range. These limitations are lessened in the arrangements of Chur, Halfhill and Stephens, Poumakis, Buehrle and Norris who teach the use of delaying circuit elements. Counting elements and comparing circuitry for coding other than RPM are taught by Eldert and Quiogue, Bailey and Jones. Additional variables must necessarily be added into and system with such arrangements. Undesirable monostable pulsing circuits, delaying circuits, variable gating circuits and the like have been used.

According to the invention, the objects indirectly referred to hereinbefore and those that will appear as the specification progresses are attained by arrangements wherein each event is evaluated by looking retrospectively to events for the timing relationship and differentiating between events occurring at predetermined time interval ratios for the PRM coding employed.

Further, according to the invention, smoothly (that is, with rates of change within limits and not abruptly) varying frequency is accommodated by the retrospective operating demodulating circuitry. For example, a printed document bearing a line of data encoded as a series of parallel bars spaced apart in accordance with F2F modulation principles is scanned merely by running an optical sensing probe across the bars manually. A wide variation in the scanning speed is accommodated as long as no abrupt changes in speed are made. Obviously, the arrangement is applicable to machine scanning, especially such machines of loose tolerances. Alternatively, a document such as a card or the like bearing a magnetic stripe is recorded from a source of varying velocity, but with a substantially fixed-frequency encoding clocking signal and reproduced thereafter by means of a fixed velocity scanning device and resolving circuitry according to the invention.

More particularly, demodulating circuitry according to the invention comprises circuitry for measuring intervals as manifested by pulses obtained from the detection circuitry and circuitry for comparing selected intervals. The circuit is arranged for delivering an indication of substantially equally spaced transitions indicating a timing wave pulse or transition. Data of one nature, a binary unit (1), for example, on determining that the predetermined ratio 2:1, for the example above, occurs as the circuitry is triggered by a pulse. On determining a ratio of 1:1 in the presence of data, the circuit is also arranged for delivering an indication of data of another nature, a binary naught (φ) for the example given, at the indication of a timing wave pulse or transition. A determination of the predetermined ratio (2:1 in the example) is indirectly determined as NOT 1:1, but is preferably obtained directly by additional circuitry also for insuring reliability of the demodulating circuitry.

More specifically, an embodiment of analog demodulating circuitry comprises a pair of integrating circuits or ramp generating circuits alternated by means of a binary switching circuit for measuring intervals and holding for suceeding intervals in response to triggering data pulses. A comparator circuit is coupled to the ramp generating circuits for comparing the amplitudes stored in the ramp circuits. The comparator circuit is arranged for delivering an output indicative only of substantial equality; that is, "equality" within a range of practical values rather than an exact ratio. The comparator circuit is arranged for delivering an output pulse which is applied to a gated flip-flop circuit for setting the same on the appearance of a data pulse for indicating data of one nature, for example, a unit (1). An inverting circuit is coupled between the comparator and the reset terminals of the gated flip-flop circuit for permitting an indication of data of another nature, a naught (φ) for the example given. Examples of component circuits for such a retrospective approach are found in copending U.S. patent application, Ser. No. 31,959 of Ernie George Nassimbene, filed on the 27th day of Apr. 1970, for "Retrospective Pulse Modulation and Apparatus Therefor" and thereafter issued on the second day of Jan. 1973, as U.S. Pat. No. 3,708,748.

Further, according to the invention, it is contemplated that solid state digital pulse handling circuitry components be used for the major part of the overall circuitry. The accumulation of reference timing pulses in conventional counting circuits is used to measure the inter-transition times. Digital, arithmetic logic circuitry is used to establish the limits of the ratios of the time intervals between transitions. Digital magnitude comparing circuits are then used for comparing the time intervals between succeeding pairs of transitions by comparing the upper and lower limits established. Digital control logic circuits are arranged for sequencing the reset, register loading, and counter circuit operation. All of the operations ensuing are controlled by the input signal.

More specifically, one approach, according to the invention, comprises a register which is arranged to be counted down with each input clock pulse to a modulo 3 divider. Another counter is counted up with the output of the modulo 3 divider. A magnitude compare of the counters is arranged to set a low limit latch if the current count is larger, after which the register is shifted left one place, effectively multiplying the contents by two; and a second comparison is made for determining the higher limit of the ratio. More particularly, ratio limits of one-third and two-thirds are contemplated for use in some applications where the rate of change of velocity is not high inasmuch as the latter is twice the former and the two bracket the value of one-half. Many conventional logical arrangements are available for use in circuit arrangements according to the invention. In one form, predetermined limit numbers are loaded into registers by transition time and counted down to values at which multiple OR gating circuits indicate substantial equality; and in other forms, numbers are compared in logical comparing circuits for indicating substantial equality. Examples of component circuits for such a retrospective digital approach are found in the IBM Technical Disclosure Bulletin, Vol. 14, No. 11, April 1972, for "Digital Compare Circuitry" by E. G. Nassimbene.

In order that full advantage of the invention may be obtained in practice, preferred embodiments thereof, given by way of example only, are described in detail hereinafter with reference to the accompanying drawing, forming a part of the specification and in which.

Figure 1:
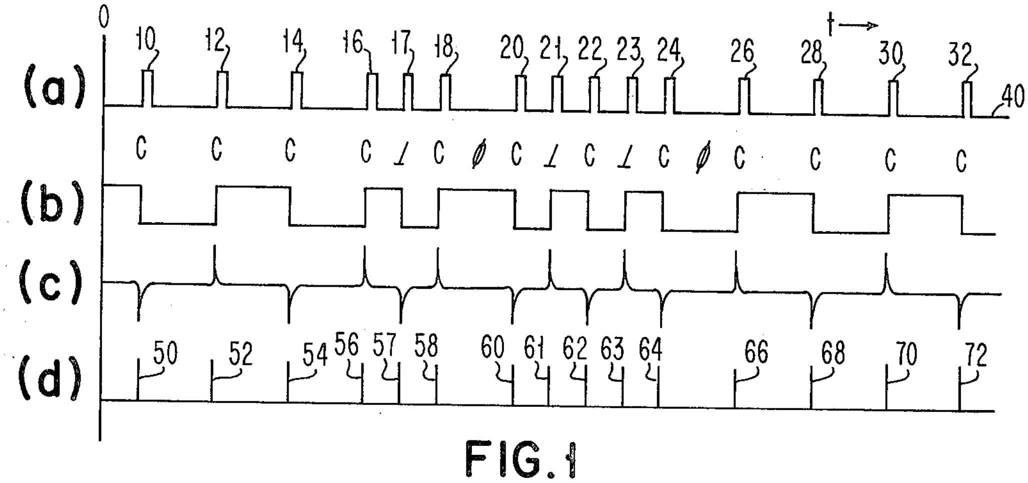
FIG. 1 is a graphical representation of pulse rate modulation waveforms useful in an understanding of the invention.

A series of interrelated pulse rate modulation waveforms is graphically represented in FIG. 1. At FIG. 1*a*, there is represented a pulse train having a number of pulses 10–32 of approximately the same amplitude spaced apart in time. The even-numbered pulses 10, 12, 14 ... 28, 30 and 32 are spaced apart at substantially equal time intervals; while the odd-numbered pulses 17, 21, 23 are interposed between the even-numbered pulses at time intervals substantially equal to one-half that between the even-numbered pulses. For inspection, it will be seen that a train of even-numbered pulses will have a constant repetition rate, or frequency, F, while a train of both even- and odd-numbered pulses will have a pulse repetition rate, or frequency, 2F. It is from this relationship that this form of pulse rate modulation is quite frequently referred to as F2F, and it will be so referred to hereinafter. Removing the reference level line 40 from the curve, in effect, leaves a series of bars spaced apart according to the same principle. With these bars in print, the spacing is converted to distance. The time dimension can be recovered by scanning such bars at substantially constant velocity. In pulse rate modulation, the even-numbered pulses (or bars) are always present and, therefore,e information is available for clocking information which is highly desirable in many applications. Although not absolutely necessary, it is customamry in a great number of applications to precede data by number of clocking pulses, as indicated, and in some other applications also to terminate data with a number of clocking pulses, as also indicated. The data in the coded group shown comprises the binary number 1φ11φ, the remainder of the group being clocking pulses only. After the preliminary stream of clocking pulses, a binary one or unit is recognized by a pulse, a pulse 17, in the center of a cell; and a naught, or binary zero, is recognized as the absence of a pulse in the center of a cell. In the prior art arrangements, an electronic window is opened near the center of the cell to see whether or not a pulse will appear. According to the invention, the examination is made at pulse time and circuitry is arranged to determine whether or not the pulse represents a unit or a clocking pulse which in the data stream also represents a naught. In many applications, PRM waves appear as that wave in FIG. 1*b* where clocking information and data appear as transitions in a bistatic signal. This form is especially prevalent in magnetic recording systems, as for example, representing the magnetic flux pattern. The latter wave, when applied to a differentiating circuit, such as that inherent in electromagnetic transducers, results in a wave as shown in FIG. 1*c*. After the differentiated wave is rectified and applied to a signal shaping circuit, a pulse wave as that of FIG. 1*d* obtains. This type of wave is ideal for many applications and is the type of wave which will be considered as the input wave to the circuitry according to the invention to be described hereinafter, although it is not to be so limited.

Figure 2:
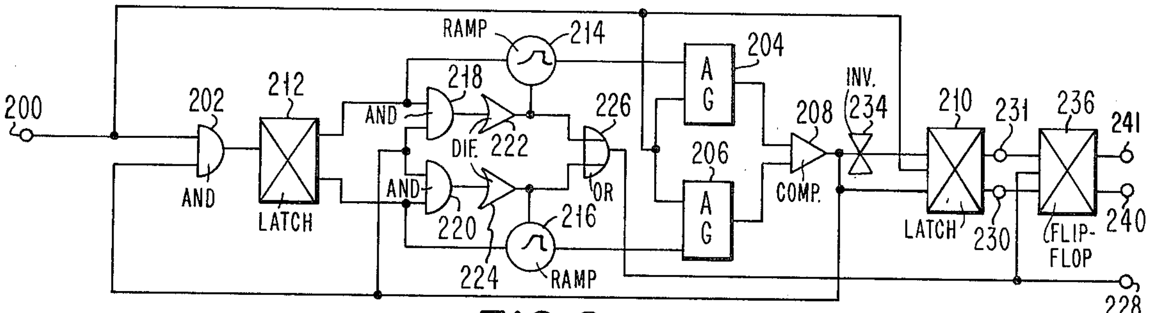
FIG. 2 is a functional diagram of decoding circuitry for demodulating pulse rate modulated waves on an analog basis.

A functional diagram of circuitry for decoding the regenerated waveform according to the invention is shown in FIG. 2. The input wave to be decoded is applied to input terminals 200. This wave is thereafter applied to an AND gating circuit 202, a pair of analog gating circuits 204, 206 and to a bilateral latching circuit 210. The outputs of the analog gating circuits 204, 206 (later to be more fully described) are applied to a comparator circuit 208, preferably of the differential amplifier type. The latter circuit is arranged to produce a predetermined output level when the two input circuits are substantially, though not necessarily, exactly equal. This comparator output is applied to the reset terminals of the latching circuit 210 and to the input AND gating circuit 202. In this manner, thee will be an output from AND gating circuit 202 only when there is both pulse input at the terminals 200 and output of the comparator circuit 208 indicating an equals comparison. Thus, on each such coincidence developing an output from the AND gating circuit 202, a binary flip-flop circuit is triggered, resulting in the two output terminals alternating in bistatic value.

The terms "latching circuit" and "binary flip-flop circuit" as used herein are construed to refer basically to circuits broadly defined as "reciproconductive circuits." As applied hereinafter, the term "reciproconductive circuit" is construed to include all dual current flow path element (including vacuum tube, transistor and other current flow controlling device) regenerative circuit arrangements in which current alternates in one and then the other of those elements in response to applied triggering potential. The "binary flip-flop circuit" refers to a "bistable reciproconductive circuit" which has a single input terminal to which triggering inpulses are applied to alternate the state of conduction each time a pulse is applied. The "latching circuit" refers to a "bistable reciproconductive circuit" having two input terminals between which sucessive triggers must be alternately applied to switch from one stable state to the other. This version is often referred to as a "bilateral flip-flop circuit." The latching circuit 210 is such a circuit which is also biased so that it is triggered only in the presence of a clocking or timing pulse on a third input terminal.

The reciprocal terminals of the binary flip-flop circuit 212 are individually connected to ramp wave generating circuits 214 and 216. A number of different conventional circuits may be used here. Essentially, it is required that an integrating function take place and that there exists an ability for holding the instant value for a period of time thereafter. The simple resistor and capacitor types of integrating circuits, particularly with diode controlled charging and longer discharging time constants, will be found suitable for most applications of the type described. A pair of AND gating circuits 218 and 220, are individually connected to the reciprocal terminals of the binary flip-flop circuit 212 and connected in common to the output circuit of the comparator circuit 208. These AND gating circuits are arranged for applying potential individually to a pair of differentiating circuits 222 and 224 for resetting the ramp wave generating circuits 214 and 216 at the beginning of each charging cycle. A basic form of such resetting circuitry comprises a normally high impedance transistor connected across the capacitive element. The differentiating circuits are connected to an OR gating circuit 226 for also generating a clocking pulse for delivering clocking pulse output at terminals 228. The values of potentials stored in the ramp generating circuits 214 and 216, which are representative of the time periods involved, and thus gated into the comparator circuit 208 through the analog gating circuits 204 and 206. These gating circuits basically may be unity gain amplifiers normally biased to cut off, the bias being removed on the application of pulses at the input terminals 200. Preferably, these circuits are linear throughout the expected operating range; but within limits, there can be considerable deviation from linearity for many applications. The same is true of the linearity of the ramp generating circuits 214 and 216. As thus far described, the circuit is effective to reset the latching circuit 210 on equal intervals between pulses being detected to establish a level at output terminals 230 indicating that the last determination was a naught or binary zero. The reciprocal terminals 231 are therefore at down level indicating that the last determination is not a unit or binary one. The unit level at terminals 231 is obtained at pulse time by the application of the output of the comparator 208 directly to the reset terminal and through an inverting circuit 234 to the set terminal of the latching circuit 210.

Sensing of an odd-numbered pulse (as defined in FIG. 1*a*) will set the latching circuit 210 to raise the unit level at terminals 231. The ramp generating circuits 214 or 216 will not be reset because the output of the comparator circuit 208 at this time will be such that both AND gates 218 and 220 will remain disabled. Thus, at the time of the next input pulse at terminals 200, the ramp generating circuits 214 and 216 will have potentials effective for resetting the latching circuit 210 bringing up the terminals 230 to the naught or binary zero level. A bistable flip-flop circuit 236 is triggered in accordance with the levels of the terminals 230 and 231 at clocking pulse time as seen at terminals 228. This circuit 236 in effect is the input stage of the utilization circuitry, for example, a shift register translating naughts and units as seen at terminals 240 and 241.

Figure 3:
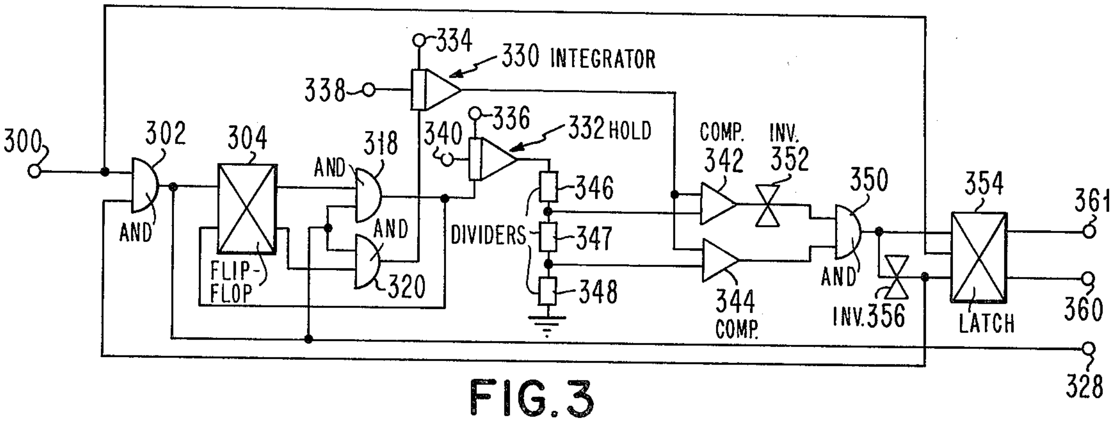
FIG. 3 is a functional diagram of alternate analog decoding circuitry.

An alternate circuit arrangement is shown functionally in FIG. 3. The input wave is applied at the input terminals 300 connected to an AND gating circuit 302 functioning similarly to AND gating circuit 202. A bilateral flip-flop circuit 304 is set by the output of the AND gating circuit 302 which also applies the clocking pulse to the AND gating circuits 318 and 320, functioning similarly to AND gating circuits 218 and 220, and delivers clocking pulses to clocking pulse terminals 328. After being set, the bilateral flip-flop circuit 304 is reset by the output of the AND gating circuit 318, producing a short pulse at clocking time. Circuits 330 and 332 are shown here as commercially available two-mode (reset to initial condition and integrate) integrating circuits. Circuit 330 is arranged as an integrating circuit and circuit 332 is arranged as an analog holding circuit. Means for resetting the circuit 330 to an initial condition of zero is connected to the terminals 338. The output of circuit 330 is applied to initializing terminals 336 for setting the initial condition of the holding circuit 332 to the signal level. Means for applying a constant input (K) to the circuit 330 is connected to the terminals 338. The output of the circuit 330 therefore is the constant (K) multiplied by the time (t), that is $$\int_0 K dt = Kxt + 0.$$

The input at terminals 340 of circuit 332 is zero, whereby the output of the circuit 332 is equal to zero, which is the initial condition and which also is the output of circuit 330.

The output terminals of the integrating circuit 330 are connected in common to comparator circuits 342 and 344. The other terminals of the comparator circuits 342, 344 are connected individually to intermediate taps on the divider arrangement comprising impedors 346, 347 and 348 connected in series across the output of the holding circuit 332. In most applications, simple resistors will be used for the impedors. The outputs of the comparator circuits 342 and 344 are applied to an AND gating circuit 350, an inverting circuit 352 being interposed in connection between comparator circuit 342 and the AND gating circuit 350. The circuit thus constituted is a range comparator circuit producing an output pulse if A > B > C, where B is the output of the integrating circuit 330 and A and C are the predetermined lower and upper limits, respectively, of the predetermined ratio of the PRM wave.

The output line of the AND gating circuit 350 is connected to the set terminals of a latching circuit 354, the reset terminals of which are connected through an inverting circuit 356 to the output of the AND gating circuit 350. The output of the inverting circuit 356 is applied to the AND gating circuit 302 for preventing triggering of the bilateral flip-flop circuit 304 on the detection of units pulses. The pulses appearing at terminals 300 are applied to the latching circuit 354 for enabling the triggering thereof at clock time and at units pulse time. The impedances offered by impedors 346–348 are chosen in accordance with the particular PRM wave to be decoded. The impedances may be substantially equal in many applications, whereby one-third and two-thirds of the output value of the circuit 332 are applied to the comparator circuits 344 and 342, respectively. These values correspond approximately to the ratio of 0.5:1.0 (which is recognized as the 2:1 ratio) for conventional pulse rate modulation waves. Thus, the units pulses are more critically analyzed for bringing up the units line at terminals 361 of the latching circuitry 354. Otherwise, the naughts terminals 360 are maintained at naught level.

Less adverse electric noise will be effective as the range is brought toward one-half the output value of the holding circuit 332 and more effective resolution is had as the range is extended; one-fourth to three-fourths is considered the maximum range in theory. Also, it should be evident that the impedor circuitry is equally well placed in the output of the integrating circuit 330, if desired.

Figure 4:
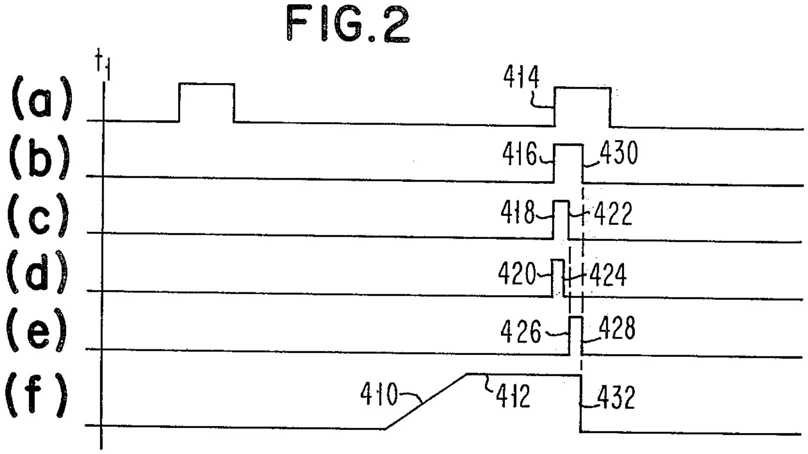
FIG. 4 is a graphical representation of waveforms useful in an understanding of the operation of the comparator circuitry according to the invention.

An example of waveforms operative for sequencing the reset to the initial condition of the integrate and hold circuits 330 and 332 is graphically represented in FIG. 4. Two pulses of a train applied to input terminals 300 are shown in FIG. 4*a*. The output of the AND gating circuit 302 is shown in FIG. 4*b*, which results in the set output with the bilateral flip-flop circuit 304, as shown in FIG. 4*c*. The set/hold pulse, or the integrating circuit 332, is shown at FIG. 4*d;* and the reset pulse for the ramp generator 330, which is developed at the output of AND gating circuit 320, is shown at FIG. 4*e*. For an assumed condition ratio of approximately 0.5:1.0 (2:1); the output AND gating circuit 350 comes up intermediately to data pulses, as shown at FIG. 4*f*. The latter curves slopes upward, as indicated by curve sector 410 and assumes a level indicated by curve sector 412. Transistions 414, 416, 418 and 420 occur within nanoseconds of each other, each being dependent on the preceding transition. Transition 422 is dependent on the constants of the bilateral flip-flop circuit 304 and effects both transitions 424 and 426. Transition 428 effects transition 430 and 432.

Figure 5:
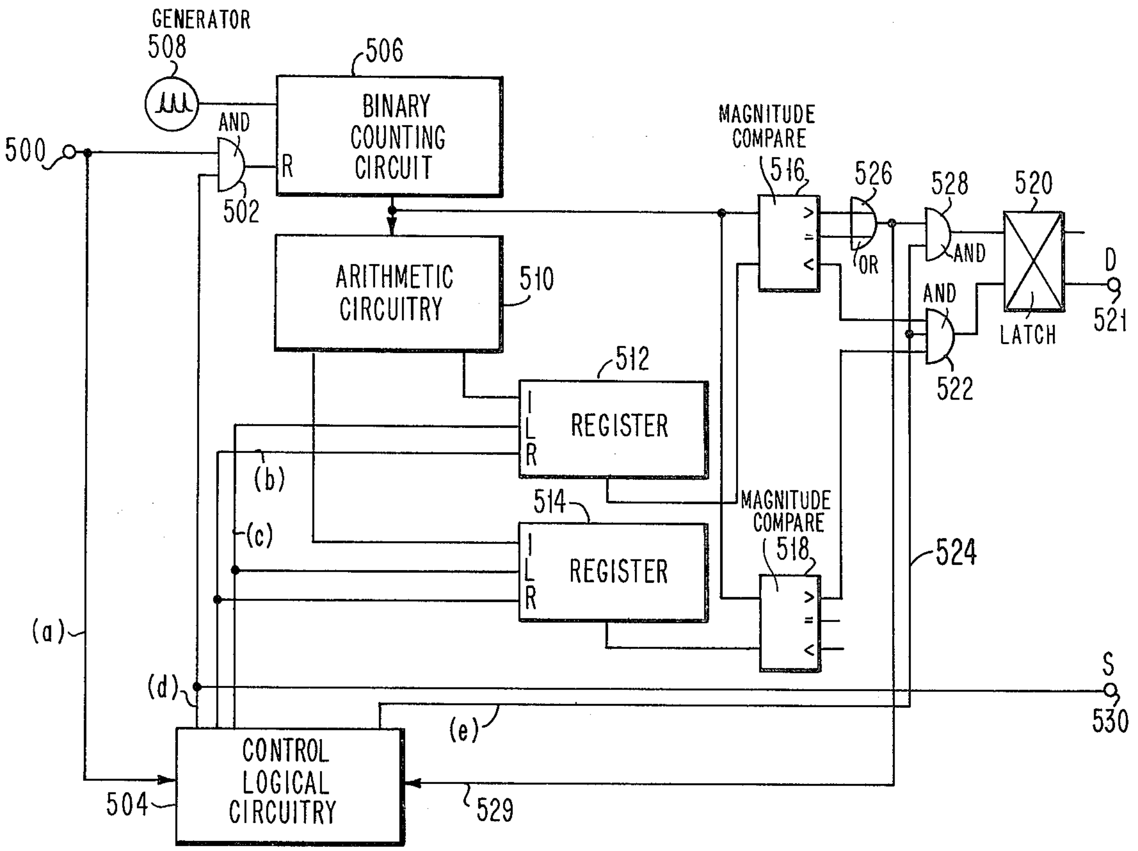
FIG. 5 is a functional diagram of digital decoding circuitry for demodulating PRM.

The developing capability to integrate a large number of semiconductor circuits onto a single chip affords the economical use of sophisticated circuitry heretofore economically feasible only for very high performance systems. One such possible arrangement is illustrated in the functional diagram of FIG. 5. The input waveform is applied to terminals 500 which are connected to an AND grating circuit 502 and control logical circuitry 504. The output of AND gating circuit 502 resets a binary counting circuit 506 to the input of which a pulse generating circuit 508 of relatively high frequency is connected. In this manner, the binary counting circuit 506 counts the number of pulses emanating from the generator 508 between input pulses or transitions. In this arrangement, counting circuitry 506 measures the time interval between successive clocking pulses or between clocking pulses and pulses indicating unit data value. Each count obtained from the counting circuitry 506 is delivered to arithmetic circuitry 510 which is arranged for predetermingng the limits for determining the presence of a unit data bit. The upper and lower limits, respectively, are placed in registers 512 and 514, the outputs of which are applied to magnitude comparing circuits 516 and 518, respectively. The upper and lower limits are compared with the current count in the binary counting circuit 506, as shown. A latching circuit 520 is reset to indicate binary unit data value at terminals 521. This is determined by an output on the LO terminal of comparator 516 simultaneously with an output on the HI terminal of comparator 518 being applied to an AND gating circuit 522, which is enabled over an electric line 524 connected to control logical circuitry 504. The latching circuit 520 is set for other values from the comparators 516 and 518. As shown here, the HI and EQUALS terminals of the comparator 516 are connected to an OR gating circuit 526 having an output lead connected to an AND gating circuit 528 for setting the latching circuit 520 and for applying a level to the control logical circuit 504 over an electric lead 529. This level on the electric lead 529 denotes an "above limit" for binary units determination condition and is useful for preventing operation of the system under such conditions. The naughts data value again coincide with a clocking pulse at strobe terminals 530, coinciding with a down level of naughts data terminals 521.

Figure 6:
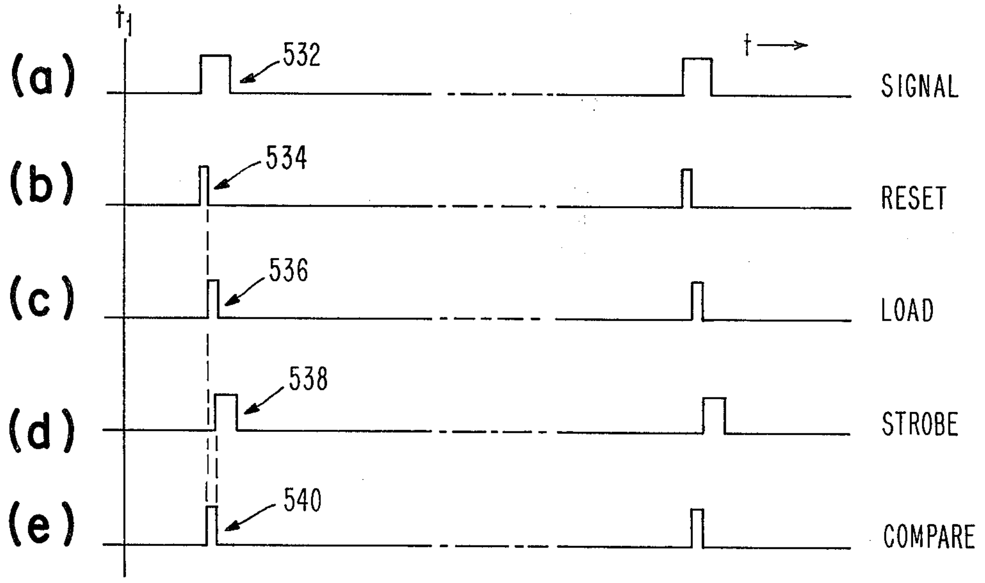
FIG. 6 is a graphical representation of waveforms pertinent to the diagram of FIG. 5.

Control logical circuitry 504 comprises conventional pulsing circuits connected in conventional manner which will be readily apparent to those skilled in the art for producing pulse waves as shown in FIG. 6. The input signal to the control logical circuit is represented by the curve 532 in FIG. 6*a*. From this input signal are derived a reset pulse wave represented by the curve 534 as shown in FIG. 6*b;* the load pulse wave represented by the curve 536 as shown in FIG. 6*c;* and the strobe pulse wave represented by the curve 538 as shown in FIG. 6*d;* and the gating wave represented by the curve 540 in FIG. 6*e*. The control logical circuitry is arranged so that the leading edges of the signal pulses (curve 532) initiate the leading edges of the resetting pulses (curve 534). The trailing edges of the resetting pulses (curve 534) initiate the leading edges of the loading pulses (curve 536) and the gating pulses (curve 540). The leading edge of the gating pulses (curve 538) are initiated by the trailing edges of the loading pulses (curve 536), while the trailing edges are timed out sufficiently later to provide an effective strobe pulse (curve 538) at the terminals 530.

Figure 7:
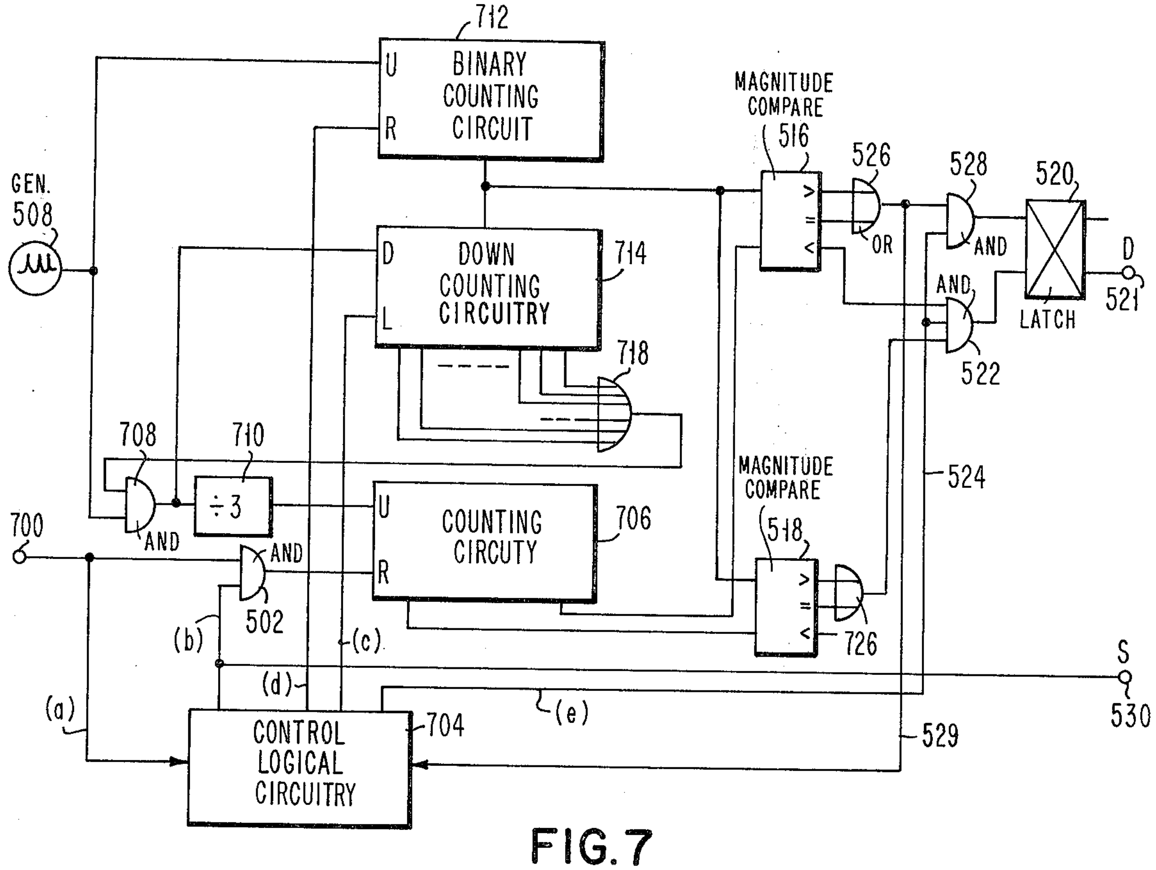
FIG. 7 is a functional diagram of further digital decoding circuitry.

An alternate digital version of the invention specifically for the limits between one-third and two-thirds is shown in the functional diagram of FIG. 7. The input wave is applied to terminals 700 connected to an AND gating circuit 502 and control logical circuitry 704. The output of the AND gating circuit 502 is connected to the reset terminal of a counting circuit 706 arranged for counting up one-third of the reference pulses emanating from a reference pulse generator 508. An AND gating circuit 708 and a dividing circuit 710 are interposed between the generator 508 and the counting circuit 706 for controlling the application of pulses as will be hereinafter described. The generator 508 is also connected directly to a binary counting circuit 712 which is reset at each clock transition under the control of the logical circuitry 704. The counting circuit 712 is arranged to provide a count on the output line that is less than the clock transition interval. Preferably the first two or three lower order stages are not transferred. This is the equivalent of dividing by four or eight, as desired with the problem at hand. The count in the binary counting circuitry 712 is transferred to a down counting circuit 714 under control of the logical circuitry 704. Counting circuit 714 is counted down in response to output from the AND gating circuit 708 when it is enabled by way of a multiple OR gating circuit 718, connected to predetermined stages of the down counting circuit 714, as shown. The count in the binary counting circuit 712 is applied to comparator circuits 516 and 518 as in the previous arrangement or preferably with an OR gating circuit 726, corresponding to the other OR gating circuit 526 interposed for a more fundamental operation. With either circuit version the count in the counter 712 is applied to the comparator circuits along with predetermined outputs from the counting circuit 706 in similar fashion to that of the earlier version. These outputs are "wired-in shifts" whereby the value at one stage is that at another stage "shifted" right or left in conventional binary fashion. For example, one value is one-third of the number and the other value is that shifted one stage, or two-thirds, of the number. The remainder of the circuitry is substantially the same as for the earlier version.

Figure 8:
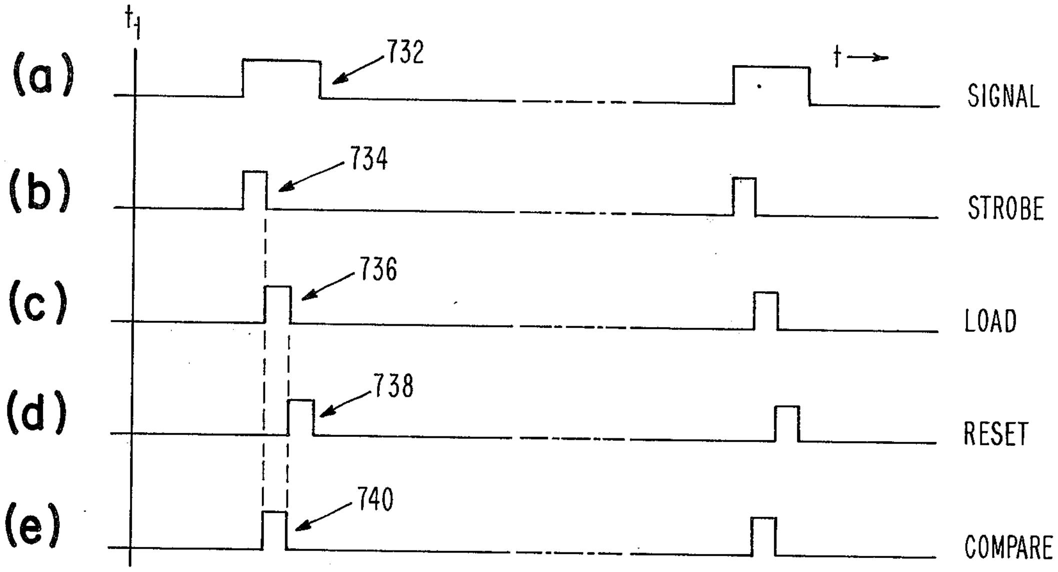
FIG. 8 is a graphical representation of waveforms pertaining to the latter diagram.

The control logical circuitry 704 is arranged for producing pulse waves as shown in the graphical representation of FIG. 8. The input signal is represented by a curve 732 in FIG. 8*a* from which a strobe pulse wave represented by a curve 734 as shown in FIG. 8*b* is derived in conventional manner. The loading of the binary counting circuit into the down counting circuit is effected in response to the pulse wave represented by a curve 736 as shown in FIG. 8*c*, and the up counting circuit 706 is reset in response to the pulse waves represented by a curve 738 as shown in FIG. 8*d*. The output circuit gating wave is represented by a curve 740 as shown in FIG. 8*e*.

Those skilled in the art will apply the principles of the invention in many other logical arrangements. An example of such application will be found in implementations comprising analog-to-digital converters.

Those skilled in the art will immediately recognize that a program-controlled computing system of general purpose capability is readily adaptable for embodying the invention. Essentially, software is arranged for the recognition of the signal pulses, the measuring of the time intervals between and the determination of data by the retrospective comparison of the time intervals.

The teaching of the invention has been exemplified by comparing successive intervals, but it should be clearly understood that the same end is served by comparing intervals spaced apart by one or more intermediate intervals as found desirable under the circumstances at hand.

While the invention has been shown and described, particularly with reference to preferred embodiments thereof, and various alternative structures have been suggested, it should be clearly understood that those skilled in the art may effect further changes without departing from the spirit and scope of the invention as defined hereinafter.

The invention claimed is:

1. Demodulating circuitry for decoding information conveyed by a train of signal manifestations of nominally equally spaced timing manifestations and other signal manifestations representating data of one nature by the presence thereof intermediate the timing manifestations and representing data of another nature by the absence of any signal manifestations intermediate of said timing manifestations, comprising an input terminal to which electric manifestations of pulse rate modulated rate are applied, a data output terminal at which electric manifestations of demodulated data are delivered, measuring circuitry coupled to said input terminal for producing an interval manifestation representative of the interval between successive signal manifestations while storing at least one associated reference manifestation representative of the interval between preceding signal manifestations, comparing circuitry coupled to said measuring circuitry for comparing each interval manifestation with at least one associated reference manifestation, for thereby decoding said information as timing information on data of said one nature, circuit connections between said comparing circuitry and said data output terminal, and circuitry connected between said comparing circuitry and said measuring circuitry for determining intervals between timing manifestations only regardless of the presence or absence of other manifestations intermediate thereof.

2. Demodulating circuitry for pulse rate modulation data reproduction accommodating variations in the modulating-trough-demodulating cycle having a predetermined ratio of pulse rate for differentiating between data of different nature comprising, an input terminal at which electric manifestations of pulse rate modulated data are applied, a data output terminal at which electric manifestations of demodulated data of one nature are delivered, circuitry coupled to said input terminal for measuring intervals between successive pairs of manifestations of data, circuitry coupled to said measuring circuitry for retrospectively comparing the measurements of successive intervals between said manifestations of data, circuitry coupled to said comparing circuitry for determining binary data of one nature on recognition that the comparisons of the measurements of said intervals are unequal, a circuit connection between said determining circuitry and said data output terminal, and electric connections for measuring intervals between manifestations of timing information only despite the presence or absence of other manifestations.

3. Demodulating circuitry for pulse rate modulation data reproduction as defined in claim 2 and wherein said predetermined ratio is 2:1.

4. Demodulating circuitry for pulse rate modulation data reproduction as defined in claim 2 and wherein said predetermined ratio lies in a range of ratios between one-third and two-thirds of the longer interval between said electric manifestations.

5. Demodulating circuitry for decoding information conveyed by a train of signal manifestations of nominally equally spaced timing manifestations and other signal manifestations as defined in claim 1, and wherein said measuring circuitry comprises a ramp voltage generating circuit effective for preserving the ramp voltage upon the appearance of a successive electric manifestation, another ramp voltage generating circuit, and circuitry responsive to the appearance of a successive nanifestation for alternating operation of said ramp voltage generating circuits in generating and storing interval manifestations.

6. Demodulating circuitry for decoding information conveyed by a train of signal manifestations of nominally equally spaced timing manifestations and other signal manifestations as defined in claim 2, wherein said measuring circuitry comprises two analog generating circuits and said comparing circuitry comprises at least one analog comparing circuit.

7. Demodulating circuitry for decoding information conveyed by a train of signal manifestations of nominally equally sspaced timing manifestations and other signal manifestations as defined in claim 2 and wherein said comparing circuitry comprises two analog comparing circuits and a voltage dividing arrangement for determining the presence of intervals of said predetermined ratio.

8. Demodulating circuitry for pulse rate modulation data reproduction accommodating variations in the modulating-through-demodulating cycle having a predetermined ratio of pulse rate for differentiating between data of different nature comprising, an input terminal to which electric manifestations of pulse rate modulated data are applied, a data output terminal at which electric manifestations of demodulated data are delivered, an AND gating circuit having an input lead connected to said input terminal and having another input lead and an output lead, a bistable flip-flop circuit having a triggering lead connected to said AND gating circuit output lead and having complementary output leads, time interval measuring circuitry connected to said complementary output leads for measuring two periods between pulse transitions appearing at said output lead of said AND gating circuit, comparing circuitry connected to said measuring circuitry for comparing the measurements and having an output terminal, a connection from said output terminal of said measuring circuitry to said other input lead of said AND gating circuit, a keyed flip-flop circuit having a keying terminal connected to said signal input terminal, having two triggering terminals coupled to said comparing circuitry in opposite phase relationship, and having complementary output terminals, a circuit connection between one of said complementary output terminals and said data output terminal, and circuit connections between said AND gating circuit and said comparing circuitry.

9. Demodulating circuitry for decoding information conveyed by a train of signal manifestations of nominally equally spaced timing manifestations and other signal manifestations as defined in claim 8 and wherein said measuring circuitry comprises two ramp voltage generating circuits individually connected to the complementary output leads of said bistable flip-flop circuit and having reset terminals, and output terminals connected to said comparing circuitry, two AND gating circuits having input leads individually connected to said complementary output leads of said complementary output leads of said bistable flip-flop circuit, input leads connected in common to said strobe terminal and output leads, two differentiating circuits connected individually between the output leads of said AND gating circuits and the reset leads of the ramp voltage generating circuits.

10. Demodulating circuitry for decoding information conveyed by a train of signal manifestations of nominally equally spaced timing manifestations and other signal manifestations as defined in claim 8 and wherein said comparing circuitry comprises a pair of gating circuits coupled to said measuring circuitry, a differential amplifying circuit having input terminals individually coupled to said gating circuits and an output terminal, and connections, including an inverting circuit between the output terminal of said difference amplifying circuit and the triggering terminals of said keyed flip-flop circuit.

11. Demodulating circuitry for decoding information conveyed by a train of signal manifestations of nominally equally spaced timing manifestations and other signal manifestations as defined in claim 2 and wherein said measuring circuitry comprises a pair of AND gating circuits having input terminals individually connected to the complementary output leads of said bistable flip-flop circuit input terminals connected in common to said strobe terminal and output leads, a pair of holding ramp generating circuits having terminals individually connected to the output leads of said pair of AND gating circuits, reference voltage terminals, initial condition reset terminals, and output terminals connected to said comparing circuitry.

12. Demodulating circuitry for decoding information conveyed by a train of signal manifestations of nominally equally spaced timing manifestations and other signal manifestations as defined in claim 8 and wherein said comparing circuitry comprises two differential amplifying circuits having input terminals connected in common to said measuring circuitry, other input terminals, and output terminals, a voltage dividing circuit having terminals connected to said measuring circuitry, said intermediate taps connected individually to the other input terminal of said differential amplifying circuits, an AND gating circuit having an input terminal connected to one of said differential amplifying circuits, another input of said differential amplifying circuit, and having an output terminal, connections including another inverting circuit to the triggering terminals of said keyed flip-flop circuit.

13. Demodulating circuitry for decoding information conveyed by a train of signal manifestations of nominally equally spaced timing manifestations and other signal manifestations as defined in claim 2 and wherein said measuring circuitry comprises digital counting circuitry and digital control logical circuitry connected to said comparing circuitry.

14. Demodulating circuitry for decoding information conveyed by a train of signal manifestations of nominally equally spaced timing manifestations and other signal manifestations as defined in claim 13 and wherein said measuring circuitry also comprises a pair of digital register circuits and a digital arithmetic circuit connected to said counting circuit for determining and holding an upper limit and a lower limit value for comparison with the current count in said digital counting circuitry in said comparing circuitry.

15. Demodulating circuitry for decoding information conveyed by a train of signal manifestations of nominally equally spaced timing manifestations and other signal manifestations comprising, an input terminal to which electric manifestations of pulse rate modulated data are applied, an output terminal at which electric manifestations of demodulated data are delivered, circuitry comprising a source of substantially uniformly spaced time interval electric impulses, control logical circuitry connected to said input terminal and to said source of electric impulses for generating a series of sequential control pulses, circuitry connected to said source and coupled to said logical control circuitry for counting the number of electric impulses between electric timing manifestations, digital impulse translating circuitry coupled to said counting circuitry for deriving at least one value of a count proportional to a preceding interval count for determining data of said one nature, circuitry connected to said counting circuitry and to said digital impulses translation circuitry for comparing the count in said counting circuitry within the count in said impulse translating circuitry for determining the presence of data of said one nature, and an electric connection between said comparing circuitry and said control logical circuitry for counting impulses between electric timing manifestations only despite the presence or absence of other manifestations.

16. Demodulating circuitry for pulse rate modulation data reproduction as defined in claim 15, and wherein said digital impulse translating circuitry comprises circuitry for deriving a range of values intermediate the limits of a preceding interval count.

17. Demodulating circuitry for pulse rate modulation data reproduction as defined in claim 16, and wherein said comparing circuitry includes two magnitude comparator circuits, an OR gating circuit connected to the HI and EQUALS output terminals of one of said magnitude comparator circuits, a bistable flip-flop circuit having set terminals coupled to said OR gating circuit reset terminals, and complementary output terminals at which data levels are available, an AND gating circuit connected to the LO terminals of said one magnitude comparator circuit and to the HI terminals of said other comparator circuit and having the output connected to the reset terminals of said bistable flip-flop circuit.

18. Demodulating circuitry for pulse rate modulation data reproduction as defined in claim 17, and wherein said digital in pulse translating circuitry includes arithmetic circuitry coupled to said counting circuit, a pair of registers connected to said arithmetic circuitry and to said magnitude comparator circuits there being connections to said control logical circuitry for transferring numerical representations from said arithmetic circuitry to said registers relative to said predetermined ratio of data representation.

19. Demodulating circuitry for pulse rate modulation data reproduction as defined in claim 17, and wherein said digital impulse translating circuitry includes another binary counting circuit having an input terminal and having a reset terminal connected to said logical control circuitry, an AND gating circuit and a dividing circuit interposed in series between said impulse generating circuit and the input terminal of said other counting circuit, a down counting circuit connected to the first said counting circuit for receiving a count therefrom under control of said control logical circuitry and having an input lead connected to the output lead of said AND gating circuit, another OR gating circuit coupled to a number of stages of said down counting circuit for deriving a predetermined number for application of another lead of said AND gating circuit, and two connections between the said counting circuit, and said magnitude comparator circuits at stages representing a difference in numbers obtainable as by shifting the counter a prearranged number of stages.

20. Demodulating circuitry for pulse rate modulation data reproduction as defined in claim 19, and wherein said dividing circuit is arranged to divide by a factor of three and said other counting circuit is arranged for shifting by a factor of two.

* * * * *